(12) United States Patent
Chen et al.

(10) Patent No.: US 7,473,126 B1
(45) Date of Patent: Jan. 6, 2009

(54) BATTERY CONNECTOR WITH IMPROVED CONTACT

(75) Inventors: De-Jin Chen, ShenZhen (CN); Wei Yuan, ShenZhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/217,179

(22) Filed: Jul. 1, 2008

(30) Foreign Application Priority Data

Jul. 10, 2007 (CN) .................. 2007 2 0040632

(51) Int. Cl.
*H01R 3/00* (2006.01)
(52) U.S. Cl. .................. 439/500; 439/862; 429/100
(58) Field of Classification Search .............. 439/500, 439/627, 862; 429/96, 100
See application file for complete search history.

(56) References Cited

U.S. PATENT DOCUMENTS

| | | | |
|---|---|---|---|
| 5,980,309 A | 11/1999 | Frantz et al. | |
| 6,120,328 A * | 9/2000 | Bricaud et al. | 439/630 |
| 6,398,598 B2 * | 6/2002 | Masumoto | 439/862 |
| 6,551,149 B2 * | 4/2003 | Orihara | 439/862 |
| 6,669,504 B2 * | 12/2003 | Wu | 439/500 |
| 7,238,045 B1 * | 7/2007 | Chang | 439/500 |
| 2005/0266741 A1 * | 12/2005 | Miyamoto et al. | 439/862 |
| 2007/0281540 A1 | 12/2007 | Liao | |

FOREIGN PATENT DOCUMENTS

TW 373814 11/1999

* cited by examiner

*Primary Examiner*—Tho D Ta
(74) *Attorney, Agent, or Firm*—Wei Te Chung

(57) ABSTRACT

A battery connector (1) comprises a dielectric housing (2), a first conductive contact (3) and a second conductive contact (4). The dielectric housing (2) defines a cylindrical receiving cavity (20) for holding a battery therein. The first conductive contact (3), secured in said dielectric housing (2) on a side wall of the receiving cavity (20), comprises a contacting section (34) facing said receiving cavity (20). The second conductive contact (4), secured in said dielectric housing (2), comprises a first spring arm (41) inclining upwardly toward the center of said receiving cavity (20), and a pair of second spring arms (46) inclining downwardly from the upper end of the first spring arm (41) giving a reinforce spring strength to said upper end of said first spring arm (41).

5 Claims, 3 Drawing Sheets

BATTERY CONNECTOR WITH IMPROVED CONTACT

BACKGROUND OF THE INVENTION

1. Field of the Invention

The present invention is generally related to a battery connector, and especially, to a button cell battery connector with improved contact.

2. Description of Related Art

A button cell battery is usually used in an electrical apparatus, for example a computer, provided as an auxiliary power source. This battery comprises a cathode on a lower face and an anode on an upper face and a peripheral face.

A battery connector is usually provided on a mother board to mount the battery therein to establish an electrical connection between the battery and the mother board. The battery connector comprises a dielectric housing defining a receiving cavity for retaining the battery therein, anode and cathode contacts respectively secured on the dielectric housing and electrically connected with the mother board. The anode contact is disposed on a side wall of the receiving cavity and can elastically move along a lateral direction while the cathode contact is disposed on a bottom of the receiving cavity and can elastically move along the vertical direction. The button cell battery is usually small, and in order to meet a low profile feature of the electrical apparatus using battery, the battery connector can't be made too high. The space in the connector is narrow, which makes the spring section of the contact often short and induces the stress concentration, and causes permanent deformation so as to destroy the contact.

Hence, an improved battery connector is required to overcome the disadvantages of the prior art.

SUMMARY OF THE INVENTION

Accordingly, an object of the present invention is to provide a battery connector for mounting a button cell battery.

In order to achieve the above-mentioned object, a battery connector comprises a dielectric housing, first and second conductive contacts; the dielectric housing defines a receiving cavity for holding a battery therein; the first conductive contact is secured in said dielectric housing and comprises a contacting section facing said receiving cavity; the second conductive contact is secured in said dielectric housing, comprises a first spring arm inclining upwardly toward a center of said receiving cavity, and at least a spring arm inclining downwardly from an upper end of said first spring arm giving a reinforce spring strength to said upper end of said first spring arm.

When mounted, the battery pushes the second conductive contact, the first and second spring arms are all elastically deformed, so the stress spreads around the first and second spring arms. Since the total length of the first and second spring arms is long, the stress is well spread, the elasticity of the second conductive contact is good, the second conductive contact can exert an enough strength to contact the battery and to hold the battery in place and will not be permanent deformed.

Other objects, advantages and novel features of the present invention will become more apparent from the following detailed description of the present embodiment when taken in conjunction with the accompanying drawings.

DETAILED DESCRIPTION OF THE INVENTION

Reference will now be made in detail to the preferred embodiment of the present invention.

Figure 1:
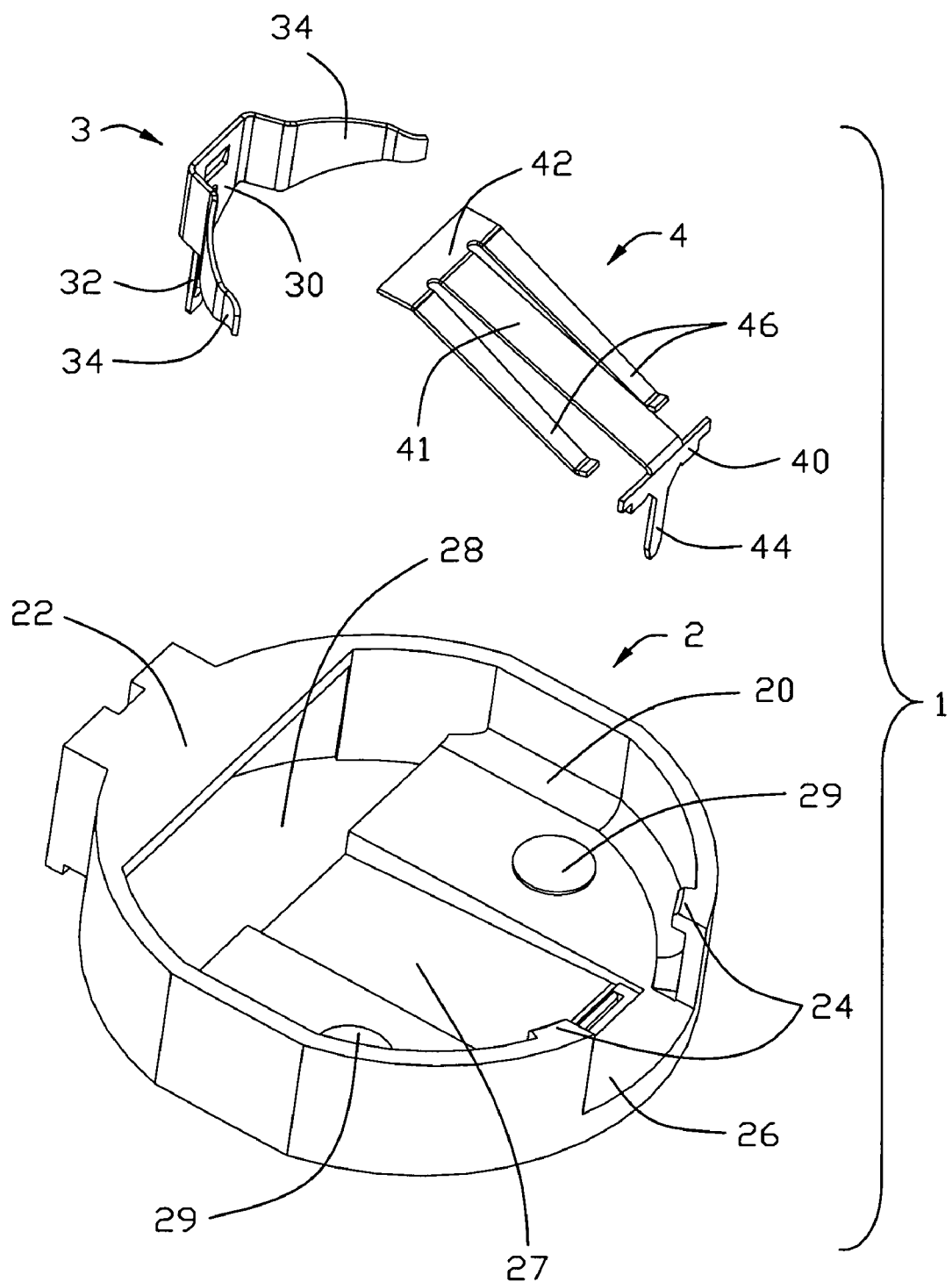
FIG. 1 is an exploded, perspective view of a battery connector of a preferred embodiment of the present invention.
Figure 2:
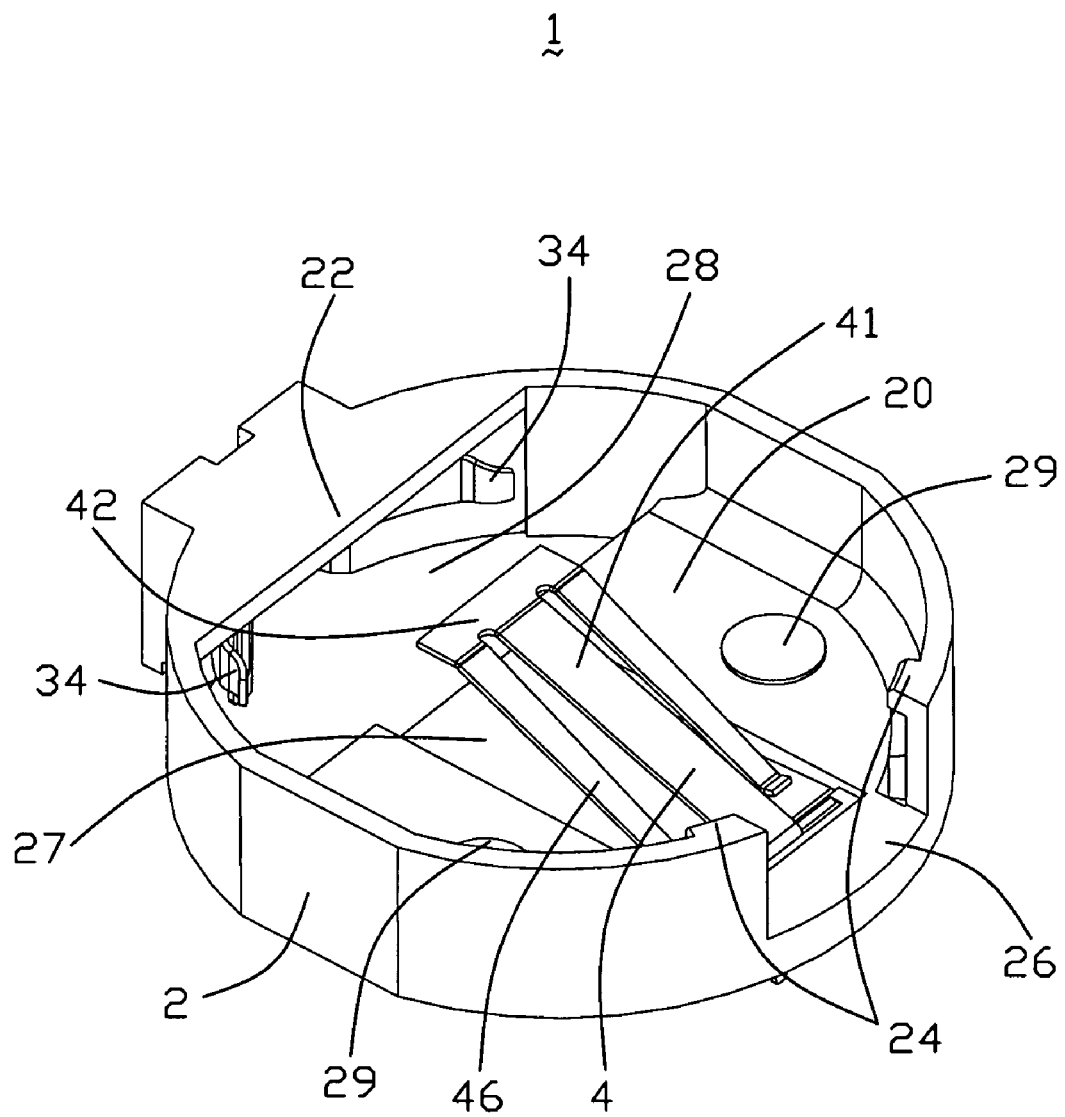
FIG. 2 is an assembled, perspective view of the battery connector as shown in FIG. 1.
Figure 3:
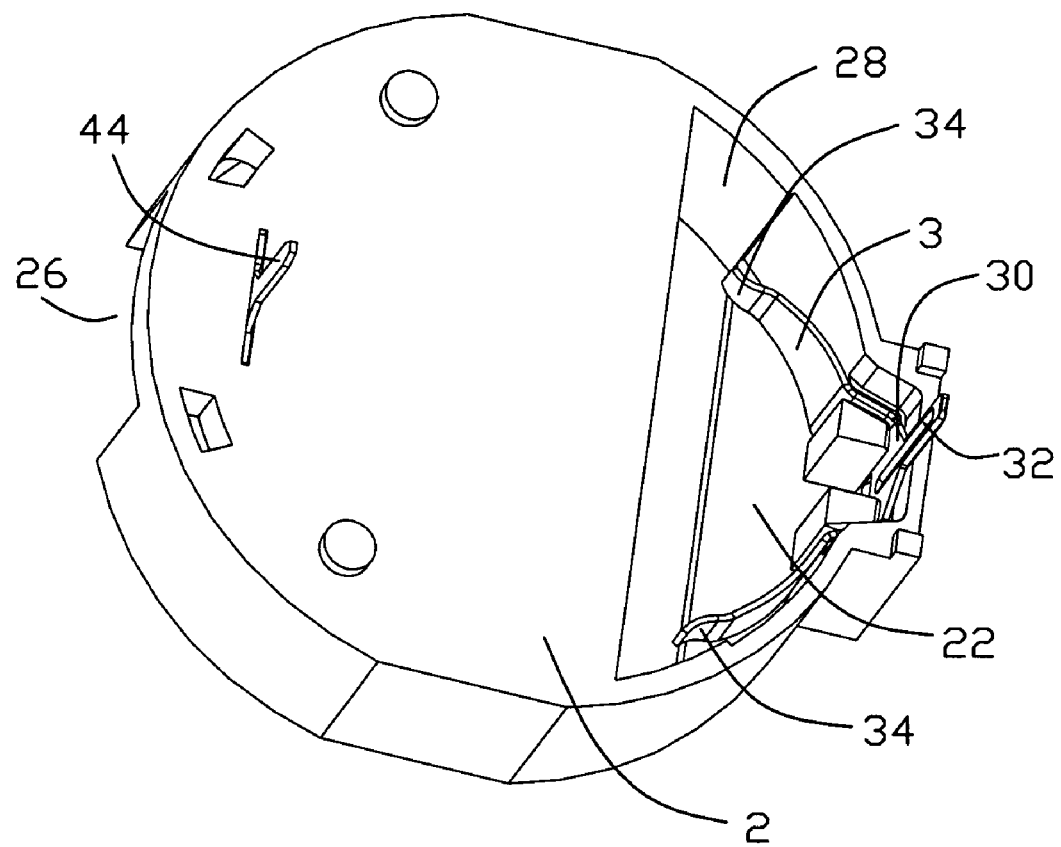
FIG. 3 is another perspective view of the battery connector as shown in FIG. 2.

Referring to FIGS. 1-3, a battery connector 1 comprises a dielectric housing 2, a first conductive contact 3 and a second conductive contact 4. The dielectric housing 2 defines a cylindrical receiving cavity 20 for holding a battery (not shown) therein. The receiving cavity 20 comprises a stopper 22 on an upper edge, a cutout 26 in the side wall opposite to the stopper 22, and a pair of holder 24 on an upper section of the side wall adjacent to the cutout 26. The stopper 22 accompany with the pair of holder 24 can secure the battery (not shown) in position. A tool, or a finger, can eject the mounted battery (not shown) out through the cutout 26.

The first conductive contact 3, secured in said dielectric housing 2 on a side wall of the receiving cavity 20, comprises a retaining section 30, a pair of arms 34 symmetrically extending from opposite sides of said retaining section 30, and a connecting portion 32 extending through said opening from the lower side of said retaining section 30; wherein the contacting section (not labeled) of the pair of arms 34 facing said receiving cavity 20, it can contact with the battery (not shown) mounted in the battery connector 1, and can give a force to eject out the battery (not shown) when dismount the battery (not shown).

The second conductive contact 4, secured in said dielectric housing 2 on the bottom of said receiving cavity 20, comprises a second retaining section 40 secured in said dielectric housing 2 near the edge of the receiving cavity 20 opposite to the first conductive contact 3, a second connecting portion 44 extending downwardly from a second retaining section 40, a first spring arm 41 inclining upwardly toward the center of said receiving cavity 20 with its lower end connected with said second retaining section 40, a contacting section 42 connected with the upper end of the first spring arm 41, and a pair of second spring arms 46 inclining downwardly from the contacting section 42 resisting the bottom surface of said receiving cavity 20 giving a reinforce spring strength to said upper end of said first spring arm 41.

When mounted, the battery (not shown) pushes the contacting section 42 of the second conductive contact 4, the free and of the second spring arm 46 constantly engages the bottom face in the receiving cavity. The inclining upwardly first spring arm 41 and the inclining downwardly pair of second spring arms 46 are all elastically deformed, so the stress spreads around the first spring arm 41 and the pair of second spring arms 46. Since the total length of the first spring arm 41 and the pair of second spring arms 46 is long, the stress is well spread, the elasticity of the second conductive contact 4 is good, the second conductive contact 4 can exert an enough strength to contact the battery (not shown) and to hold the battery (not shown) in place and will not be permanent deformed.

The bottom surface of said receiving cavity 20 defines a recess 27 right below the contacting section 42 of the second conductive contact 4, the recess 27 has a shape such that the further the recess leaves away from the retaining section 40 the deeper it will be, it can contain the contacting section 42 when the battery is mounted. The bottom surface of said receiving cavity 20 further defines a pair of projections beside the recess 27. The a pair of projections is higher than the lower end of the contacting section 42, so it can protect the lower end of the contacting section 42 from destruction when pressed by a mounted battery.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A battery connector comprising:
   a dielectric housing defining a receiving cavity for holding a battery therein;
   a first conductive contact secured in said dielectric housing and comprising a contacting section facing said receiving cavity; and
   a second conductive contact secured in said dielectric housing, comprising a first spring arm inclining upwardly toward a center of said receiving cavity, and at least a second spring arm inclining backwardly and downwardly from an upper end of said first spring arm giving a reinforce spring strength to said upper end of said first spring arm;
   wherein said receiving cavity of the dielectric housing is cylindrical, said first conductive contact is secured on a side wall of the receiving cavity;
   wherein said dielectric housing defines a stopper above said first conductive contact, a cutout in a side wall of the housing opposite to said first conductive contact, and a holder on an upper section of the side wall adjacent to said cutout;
   wherein said dielectric housing defines an opening in the bottom surface through which the first conductive contact is assembled into said dielectric housing, said first conductive contact comprises a retaining section, a pair of arms symmetrically extending from opposite sides of said retaining section, and a connecting portion extending through said opening from a lower side of said retaining section;
   wherein said second conductive contact comprises a second retaining section secured in said dielectric housing near an edge of the receiving cavity opposite to the first conductive contact, a second connecting portion extending downwardly from the second retaining section, and a contacting section connected with the upper end of said first spring arm, a lower end of said first spring arm connected to said second retaining section.

2. The battery connector as described in claim 1, wherein the bottom surface of said receiving cavity defines projections for protecting the lower end of the contacting section from destruction when pressed by a mounted battery.

3. A battery holder comprising:
   a dielectric housing defining a receiving cavity;
   a second conductive contact comprising: a retaining section mounted on a peripheral area of the receiving cavity;
   a first spring arm extending from the retaining section toward the cavity; and
   a second spring arm extending backwardly from a distal end of the first spring arm, a free end of said second spring arm engages a bottom face in the receiving cavity when a battery is loaded in the receiving cavity;
   wherein said receiving cavity of the dielectric housing is round, said battery connector further comprises a first conductive contact secured on a side wall of the receiving cavity, comprising a contacting section facing said receiving cavity;
   wherein said dielectric housing defines a stopper above said first conductive contact, a cutout in a side wall of the housing opposite to said first conductive contact, and a holder on an upper section of the side wall adjacent to said cutout;
   wherein said dielectric housing defines an opening in the bottom surface through which the first conductive contact is assembled into said dielectric housing, said first conductive contact comprises a retaining section, a pair of arms symmetrically extending from opposite sides of said retaining section, and a connecting portion extending through said opening from a lower side of said retaining section;
   wherein said second conductive contact comprises a second retaining section secured in said dielectric housing near an edge of the receiving cavity opposite to the first conductive contact, a second connecting portion extending downwardly from the second retaining section, and a contacting section connected with the upper end of said first spring arm, a lower end of said first spring arm connected to said second retaining section.

4. The battery connector as described in claim 3, wherein the bottom surface of said receiving cavity defines projections for protecting the lower end of the contacting section from destruction when pressed by a mounted battery.

5. A battery connector comprising:
   an insulative housing defining a bottom wall and a circular circumferential wall commonly defining an upward battery receiving space;
   a second conductive contact including:
   a leg extending downwardly through the bottom wall;
   a contact arm extending upwardly and obliquely from the leg with a contacting region at a distal end region thereof; and
   an auxiliary arm extending downwardly and obliquely from the contacting region with thereof another distal end region closer to the bottom wall than the contacting region under a condition that said another distal end region is configured to abut against the bottom wall when the battery is loaded into the battery receiving space;
   wherein said battery connector further comprises a first conductive contact secured on a side wall of the upward battery receiving space, comprising a contacting section facing said upward battery receiving space;
   wherein said insulative housing defines a stopper above said first conductive contact, a cutout in a side wall of the housing opposite to said first conductive contact, and a holder on an upper section of the side wall adjacent to said cutout.

* * * * *